United States Patent [19]

Zimmerman et al.

[11] Patent Number: 5,682,510
[45] Date of Patent: Oct. 28, 1997

[54] METHOD AND SYSTEM FOR ADDING APPLICATION DEFINED PROPERTIES AND APPLICATION DEFINED PROPERTY SHEET PAGES

[75] Inventors: Christopher A. Zimmerman, Bellevue; Christopher Lee Fraley, Woodinville; John E. Elsbree, Redmond, all of Wash.

[73] Assignee: Microsoft Corporation, Redmond, Wash.

[21] Appl. No.: 413,396

[22] Filed: Mar. 30, 1995

[51] Int. Cl.⁶ .................................................. G06F 15/00
[52] U.S. Cl. ..................... 395/352; 395/346; 395/601
[58] Field of Search ........................ 395/155, 157, 395/159, 161, 335, 340, 346, 347, 352, 601

[56] References Cited

U.S. PATENT DOCUMENTS

| | | | |
|---|---|---|---|
| 5,467,472 | 11/1995 | Williams et al. | 395/600 |
| 5,572,644 | 11/1996 | Liaw et al. | 395/793 |

*Primary Examiner*—Mark R. Powell
*Assistant Examiner*—Huynh-Ba
*Attorney, Agent, or Firm*—Seed and Berry LLP

[57] ABSTRACT

A method and system for adding application defined properties and application defined property sheet pages are provided. The application defined properties may be added to a list of system defined properties. Once added, the application defined properties may be displayed and edited. In addition, a user may select several objects, display the properties common to all of the objects in a list, and edit the common properties. Moreover, application defined property sheet pages may be added to a set of system defined property sheet pages. A user may then display and edit the application defined property sheet pages. Also, a user may select several objects, display the properties common to all of the objects on a per-property browsing list, and edit the common properties. In addition, a user may select several objects, display the property sheet pages common to all of the objects, and edit the properties on these property sheet pages. Furthermore a user may switch between viewing a property in a list of properties and viewing a property on a property sheet page.

28 Claims, 15 Drawing Sheets

| X | ✓ | Label | | ↑ |
|---|---|---|---|---|
| | | | | |
| | | | | |
| | | | | |
| | | | | ▨ |
| | | Font Name | Roman | |
| | | Font Size | 12 | |
| | | | | |
| | | | | |
| | | | | |
| | | | | |
| | | | | |
| | | | | ↓ |

*Fig. 1*
*(Prior Art)*

METHOD AND SYSTEM FOR ADDING APPLICATION DEFINED PROPERTIES AND APPLICATION DEFINED PROPERTY SHEET PAGES

TECHNICAL FIELD

The present invention relates generally to data processing systems and, more particularly, to displaying and editing properties of an object.

BACKGROUND OF THE INVENTION

Objects often have properties associated with them. A property defines an aspect of a state of an object. For instance, a label for a form may be represented as an object, and the label object may have a "Font Name" property that identifies the font of the text contained in the label. A property also has an associated type, such as string or integer. An object typically has system defined properties associated with it. System defined properties are properties whose types are defined by the system. An object may also have application defined properties associated with it. Application defined properties are properties whose types are defined by an application developer. An application developer also defines an object and properties associated with the object.

Current systems enable a user to display and edit system defined properties of an object, such as the "Font Name" property. Some systems offer the per-property browsing method which allows display and editing of system defined properties which appear in a list, as illustrated in FIG. 1. Other systems offer the property sheet page method which allows display and editing of system defined properties which appear on system defined property sheet pages, as illustrated in FIG. 2. System defined property sheet pages are property sheet pages which are defined by the system.

The per-property browsing method displays all system defined properties of one object on a list, typically in alphabetical order. For instance, in FIG. 1, a list of properties for a label object is depicted. One property name "Font Name" is shown along with the current value "Roman." This method enables a user to find a particular property by searching the list for the system defined property. For example, a user would search through the list illustrated in FIG. 1 to find the property name "Font Name."

The property sheet page method groups system defined properties into logical subsets which are displayed on system defined property sheet pages on a per object basis. Each system defined property sheet page may be used to display or edit a portion of the state of an object. For example, in FIG. 2, the "Font" group is illustrated on a system defined property sheet page for a label object, along with the property names "Font Name" and "Font Size." FIG. 2 shows that the current state of the object is a "Roman" font name with size 12 print. Also, the method enables a user to find a particular system defined property by requesting the group that includes the system defined property. For example, the method enables a user to find the property name "Font Name" by requesting the "Font" group.

Additionally, objects generally have system defined properties associated with them. Some objects also have application defined properties associated with them. Some current systems are limited in their capabilities in that they do not provide display and editing of application defined properties, although they provide display and editing of system defined properties.

Conventional systems lack the ability to provide multiple selection. That is, some conventional systems allow for display and editing of properties of a single object. When several objects have common properties which a user wishes to edit, the user selects each object and edits its property separately. With multiple selection, however, a user may display and edit the common properties of several objects at one time.

Also, conventional systems do not provide the ability to switch between the per-property browsing and property sheet page methods. Some users may prefer one method over the other. Also, sometimes, a user may prefer to use one method and then switch to the other method. Therefore, a user should be able to switch between the per-property browsing and property sheet page methods.

SUMMARY OF THE INVENTION

The above-described difficulties encountered by conventional systems are overcome by the present invention. In accordance with a first aspect of the present invention, a method is practiced in a data processing system that includes a video display and a processor that runs an application program. The data processing system also includes an operating system that includes a per-property browser. In this method, an object with associated system defined properties is provided. A list of system defined properties is displayed on the video display. An object with an associated application defined property is provided. An identifier to an application defined property type that is defined by the application program is obtained. A current value for the application defined property is obtained. The identifier of the application defined property type and the current value for the application defined property are added to the list of system defined properties displayed on the video display.

In accordance with a further aspect of the present invention, a data processing system includes a video display and a processing means running an operating system and an application program. A list of system defined properties is also included in the data processing system. In this system, a means for displaying a list of system defined properties on the video display is provided. Also, a means for providing an object with an associated application defined property is included in the system. A means for obtaining an identifier to an application defined property type defined by the application program is provided. The system also includes a means for obtaining a current value for the application defined property. A means for adding the identifier of the application defined property type and the current value for the application defined property to the list of system defined properties displayed on the video display is provided.

In accordance with an additional aspect of the present invention, a method is practiced in a data processing system having a video display, a processor running an operating system, and a per-property browsing list. In this method, an object with an application defined property is provided. Code for a function is called to obtain the type of the application defined property. Code for a function is called to obtain the current value of the application defined property. The type and current value of the application defined property are added to the per-property browsing list.

In accordance with another aspect of the present invention, a method is practiced in a data processing system that includes a video display and a set of system defined property sheet pages. An operating system that includes a property sheet page browser for browsing property sheet pages is also included in the data processing system. In this method, an object and an associated application defined property sheet page for the object are provided. The application defined property sheet page is added to the set of system defined property sheet pages displayed on the video display. The set of system defined property sheet pages is browsed using the property sheet page browser.

In accordance with yet another aspect of the present invention, a data processing system includes a processing means for running an operating system, a video display, and a set of system defined property sheet pages. The system provides means for displaying the set of system defined property sheet pages. The system also provides means for providing an object with an associated application defined property sheet page. The system further provides means for adding the application defined property sheet page to the set of system defined property sheet pages displayed on the video display.

In accordance with an additional aspect of the present invention, a method is practiced in a data processing system that includes a video display. In this method, a plurality of objects, each having associated application defined properties, are received. The common application defined properties of the different objects are determined. The common application defined properties are displayed on a per-property browsing list on a video display.

In accordance with another aspect of the present invention, a method is practiced in a data processing system that includes a video display. In this method, a plurality of objects, each having associated property sheet pages, are received. The method determines whether the objects have common property sheet pages. When the objects have common property sheet pages, the method displays the common property sheet pages on a video display.

In accordance with yet another aspect of the present invention, a method is practiced in a data processing system that includes a video display and an operating system that includes a per-property browser and a property sheet page browser. An application defined property is provided. A per-property browsing list having an entry for the application defined property is provided. A property sheet page browser having a property sheet page for the application defined property is provided. When receiving user input indicating a desire to switch from the per-property browser to the property sheet page browser, the method maps to a property sheet page. When receiving user input indicating a desire to switch from the property sheet page browser to the per-property browser, the method maps to a property sheet page containing a per-property browsing list.

BRIEF DESCRIPTION OF THE DRAWINGS

Figure 1:
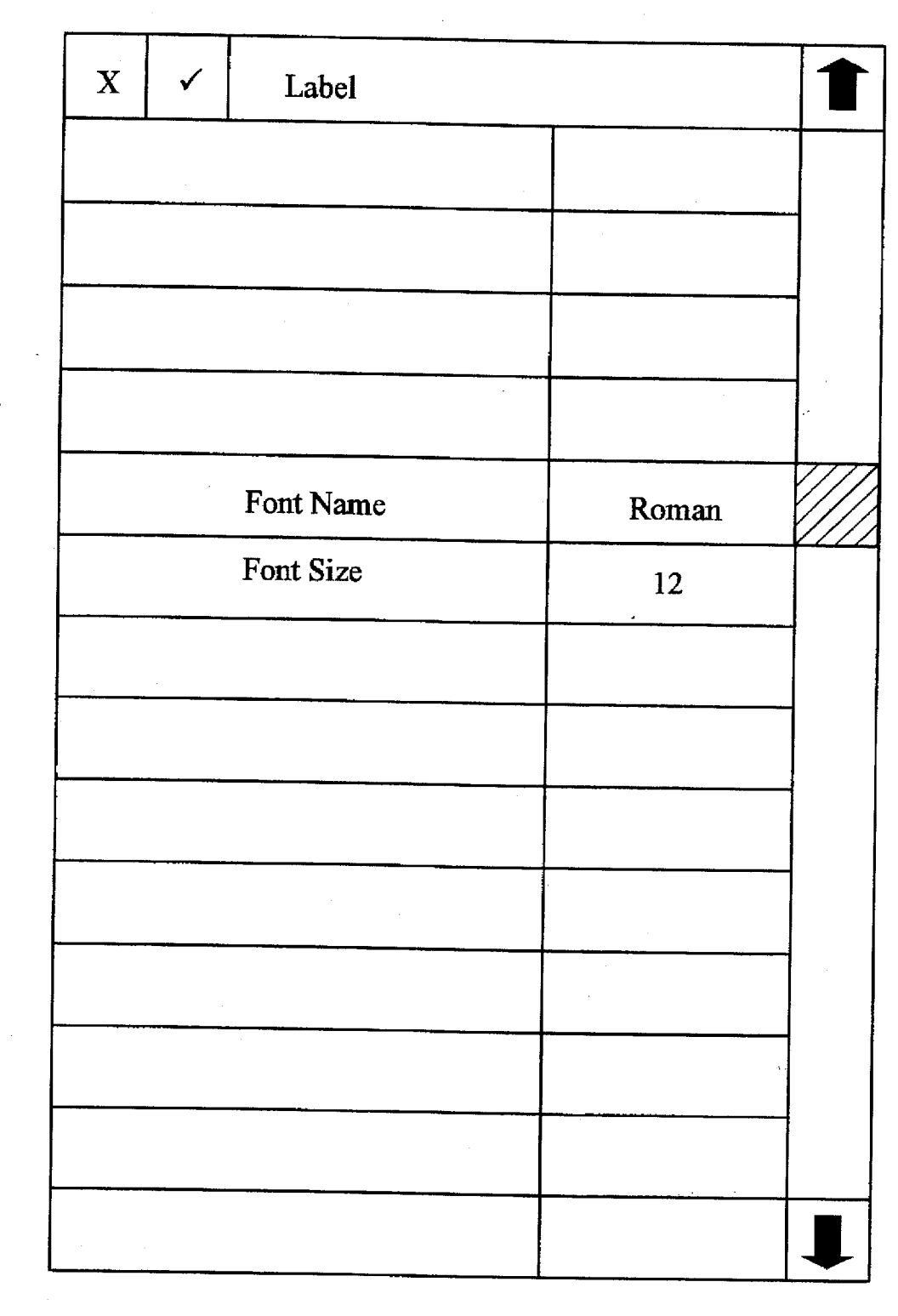

FIG. 1 is an illustration of a user interface in which a conventional per-property browsing list is displayed.

DETAILED DESCRIPTION OF THE INVENTION

The preferred embodiment of the present invention extends the capabilities of the per-property browsing method by allowing a user to display and edit application defined properties for an object. In addition, the preferred embodiment enables a user to select several objects, to display the properties common to all of the objects in a list, and to edit them. Moreover, the preferred embodiment extends the capabilities of the property sheet page method by allowing a user to display and edit application defined property sheet pages. Also, the preferred embodiment of the present invention enables a user to select several objects, to display the property sheet pages common to all of the objects, and to edit properties on the displayed property sheet pages. Furthermore the preferred embodiment enables a user to switch between the per-property browsing and property sheet page methods.

The preferred embodiment of the present invention is practiced in an object-oriented environment that supports the Microsoft OLE 2.01 protocol developed by Microsoft Corporation of Redmond, Wash. In order to fully understand the preferred embodiment of the present invention, it is helpful to review some of the fundamental concepts employed within Microsoft OLE 2.01.

An "object class" is the definition of both a data structure and functions that manipulate the data structure. An "object" is an instance of an object class. An "interface" is a group of semantically related functions that are organized into a named unit. The name of the unit is the identifier of the interface. Interfaces have no instantiation in that the interface does not include code for implementing the functions that are identified in the interface; rather, the interface specifies a set of signatures for functions. "Instantiation" refers to the process of creating in-memory structures that represent an object so that the operations can be invoked on the object. When an object "supports" an interface, the object provides code for the function specified by the interface. Hence, an object that supports an interface is responsible for providing the code for implementing the functions of the interface. The code that is provided by the object must comply with the signatures specified by the interface.

Figure 2:
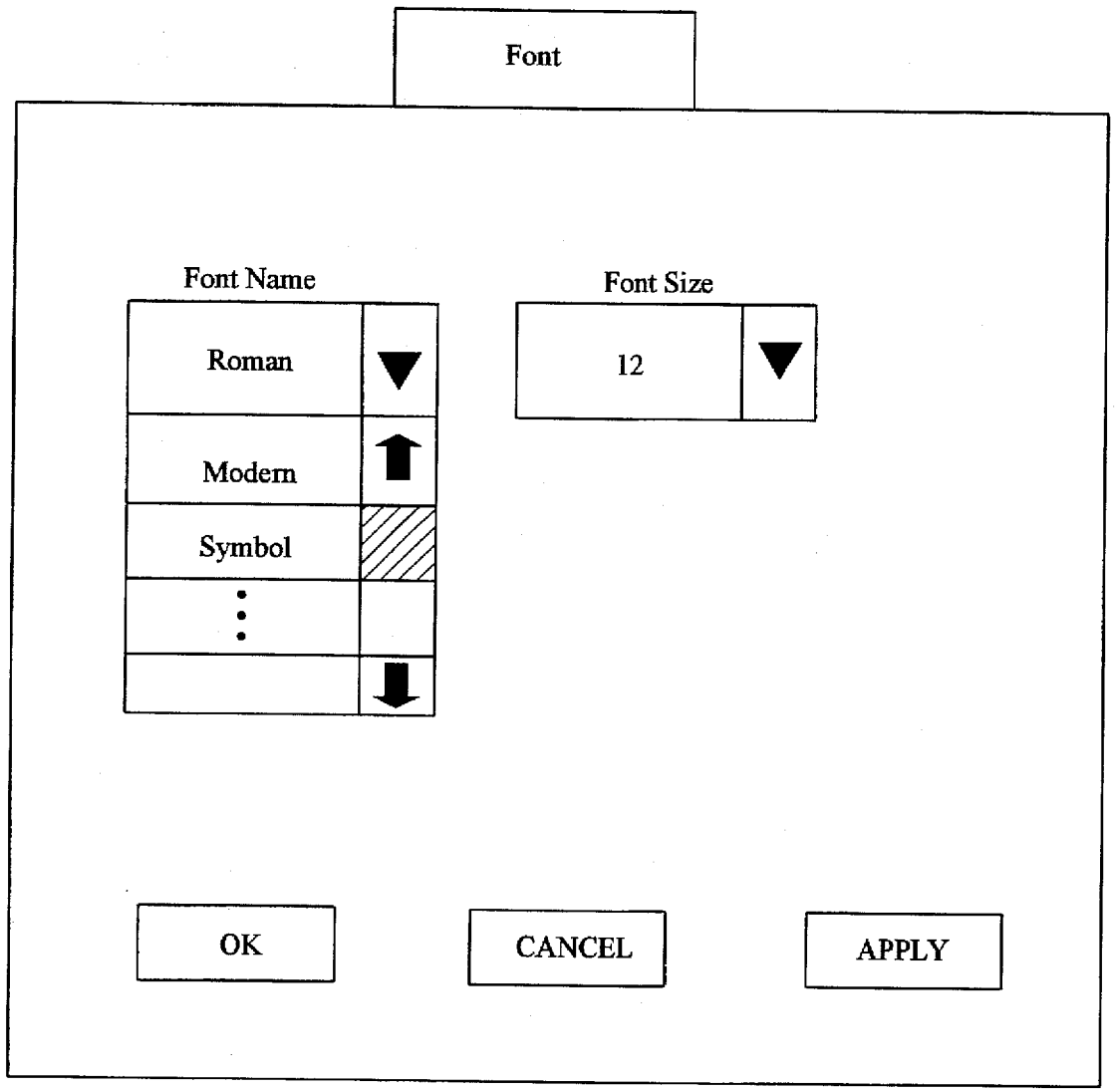
FIG. 2 is an illustration of a user interface in which a conventional property sheet page is displayed.
Figure 3:
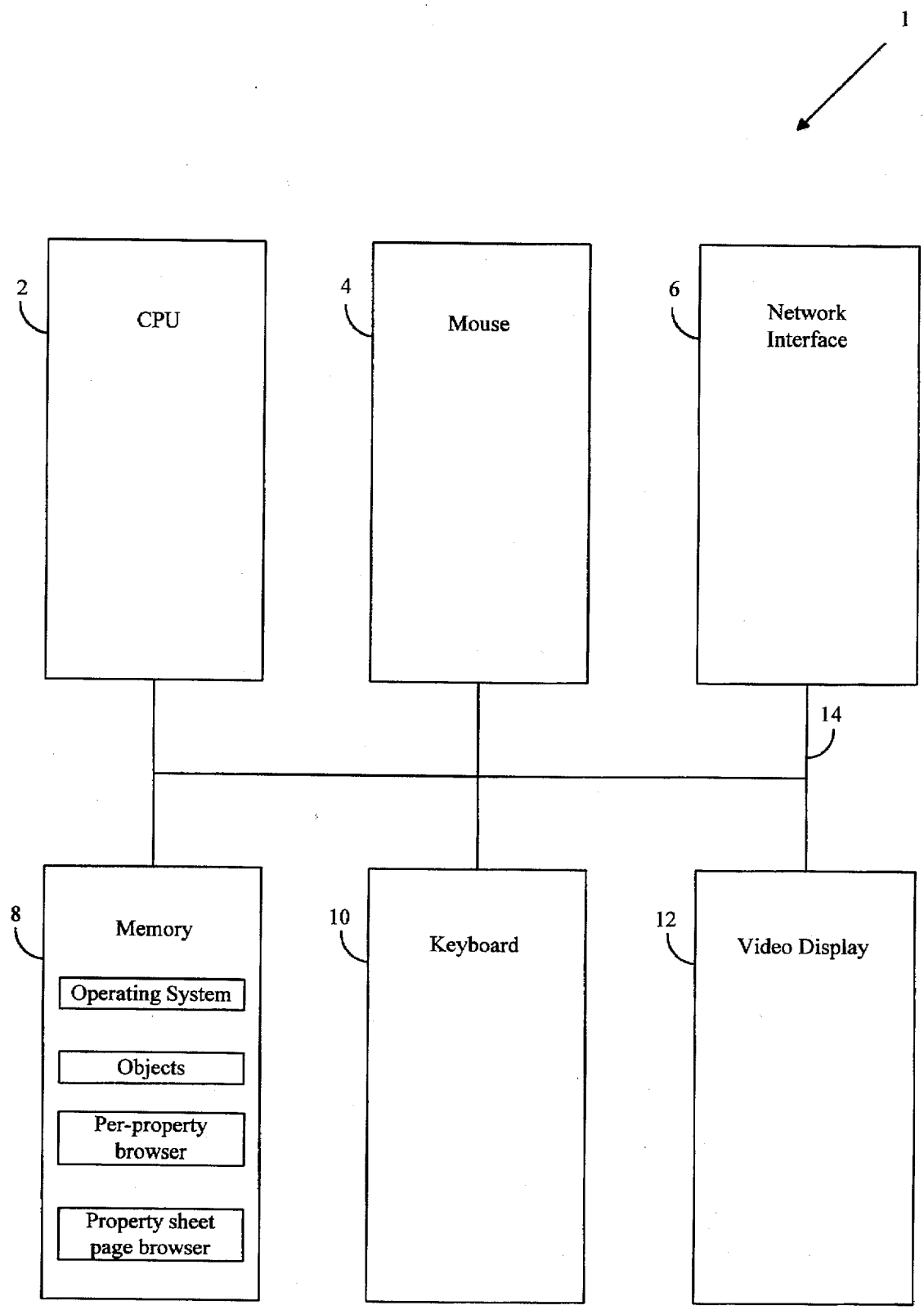
FIG. 3 is a block diagram of a computer system which is suitable for practicing the preferred embodiment of the present invention.

FIG. 3 is a block diagram of a computer system 1 which is suitable for practicing the preferred embodiment of the present invention. The computer system 1 includes a central processing unit (CPU) 2 that is connected to a number of input/output devices, including mouse 4, keyboard 10, and video display 12. The computer system 1 also includes a network interface 6 for interfacing the computer system with a network. Memory 8 stores data and code. Specifically, memory 8 holds a copy of an operating system, objects, a per-property browser, and a property sheet page browser. A bus 14 connects the components of the computer system.

Figure 6:
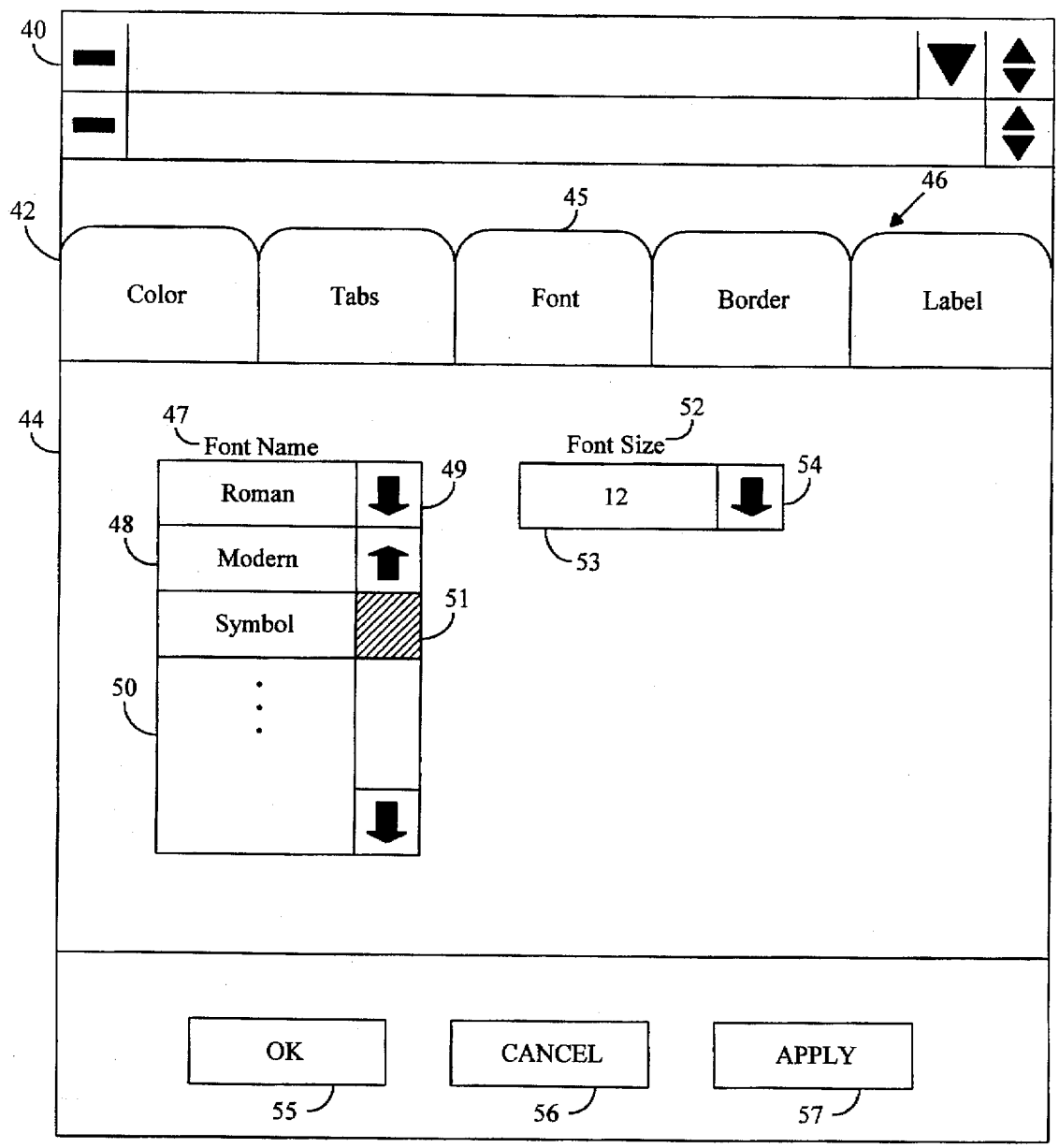
FIG. 6 is an example of a user interface in which an application defined property sheet page is generated in accordance with the preferred embodiment of the invention.
Figure 7:
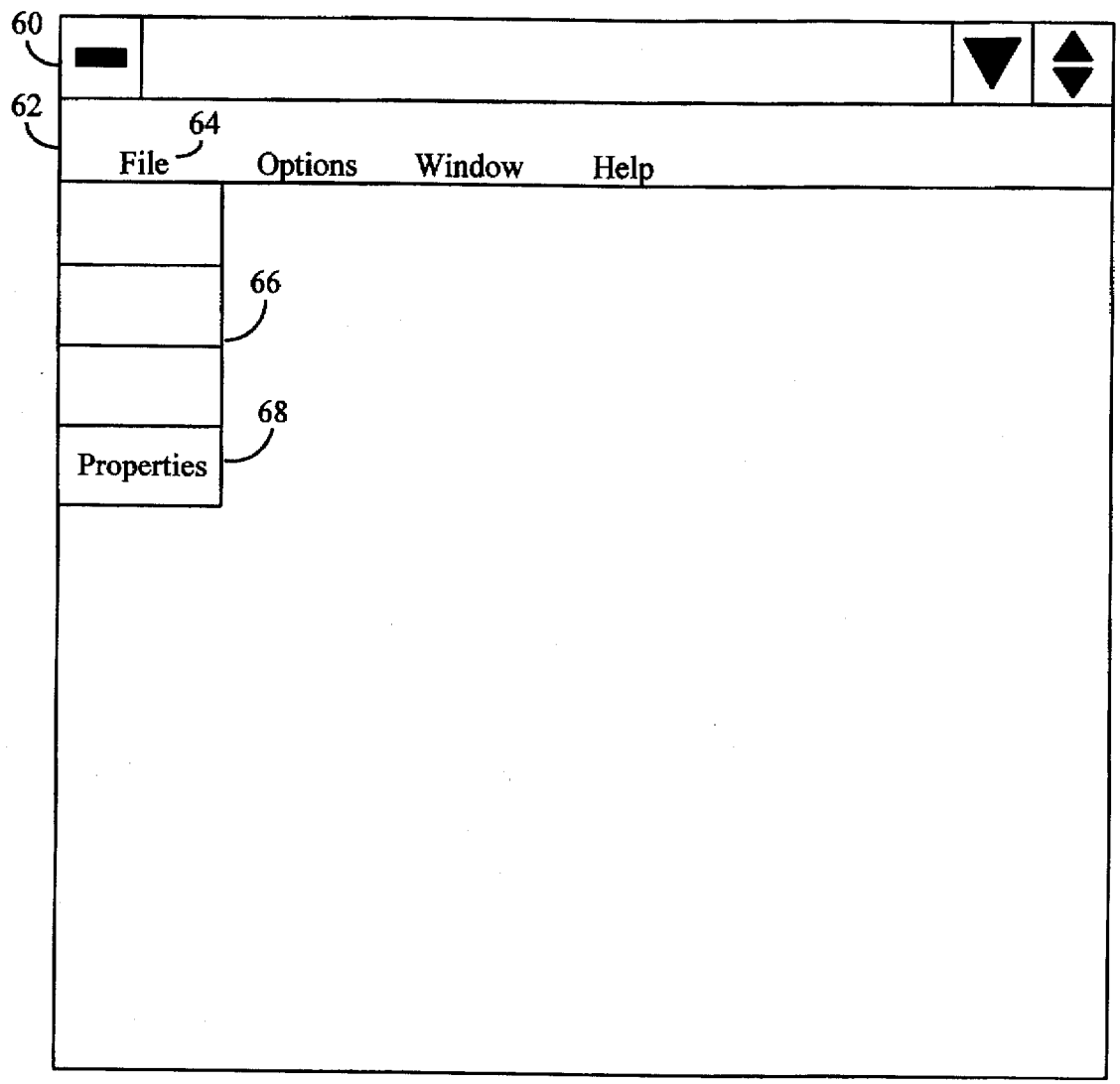
FIG. 7 is an example of a user interface in which a window containing menu options is displayed in accordance with the preferred embodiment of the invention.

Before discussing the code and structures used to facilitate the code, the user interface will be discussed. Specifically, FIGS. 4–7 represent sample user interfaces producing an illustrative embodiment of the present invention, which will be described before the flowcharts of FIGS. 8–5 are discussed.

Figure 4:
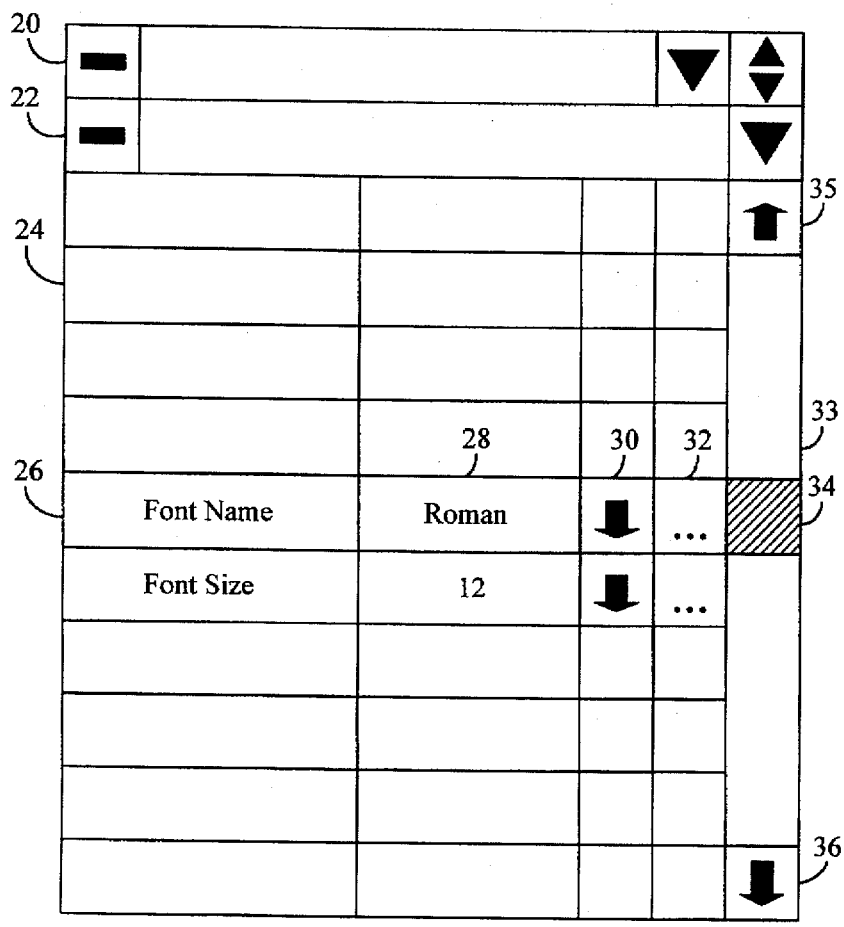
FIG. 4 is an example of a user interface in which a per-property browsing list is displayed in accordance with the preferred embodiment of the invention.

FIG. 4 is an example of a user interface in which a per-property browsing list 24 is displayed in accordance with the preferred embodiment of the invention. The user interface includes a per-property browser 22 that enables a user to browse the current property values associated with properties of an object. The per-property browser 22 is within a window 20 that is produced by a development environment. The development environment is a set of resources made available to the user of a system which includes code providing system defined interfaces. The per-property browser 22 is part of the development environment, and it provides the framework within which a per-property browsing list 24 is displayed. Each element in the per-property browsing list 24 includes a property name 26, a current property value 28, a drop down list button 30, and a property sheet page map button 32. The per-property browsing list 24 has system defined properties. The per-property browser 22 enables a user to add application defined properties to the per-property browsing list 24. Then, the per-property browser 22 displays both the system defined properties and the application defined properties in the per-property browsing list 24. For instance, the per-property browsing list 24 has the property name 26 "Font Name" and the current property value 28 "Roman."

A user may search through the per-property browsing list 24 by depressing arrow keys on the keyboard 10. As the user depresses the arrow keys, the currently selected property is incremented so that the next property in sequence is selected. A visual cue to the user, such as highlighting, is generally provided to identify the currently selected property. In addition, a user may search through the per-property browsing list by using the scroll bar 33. The scroll bar 33 has a scroll box 34, a scroll down arrow 35, and a scroll up arrow 36. In order to use the scroll bar 33, the user points at the scroll box 34 with a user pointing device, such as a mouse 4, and while pointing at the scroll box 34, enters a user selection indicator, such as a click of a designated mouse button. Then, while keeping the mouse button depressed, the user may drag the scroll box 34, up or down, to view different portions of the per-property browsing list 24. A mouse is a user pointing device, which has one or more mouse buttons, and clicking on a mouse button outputs a user selection indicator which selects the element pointed at by the mouse. In order to scroll the per-property browsing list 24 by a single element, either up or down, a user may use a mouse to point at the scroll up arrow 35 or scroll arrow down 36 and click a designated mouse button. Additionally, if a user uses a mouse to point at the scroll up arrow 35 or scroll down arrow 36, and keeps the mouse button depressed, the scrolling continues until the mouse button is released. This allows a user to quickly scroll through the per-property browsing list 24. An element may be selected from the per-property browsing list 24 by pointing at it with a mouse 4 and clicking a designated mouse button. For the following discussion, "mouse" will be used in place of "user pointing device," but one skilled in the art would appreciate that other user pointing devices would be equivalent.

After selecting a property, a user may activate the property sheet page map button 32 to switch to a corresponding property sheet page that displays values of the property group containing the selected property. The property sheet page map button 32 may be activated by using a pointing device, such as a mouse 4, to point at the property sheet page map button 32 and by entering a user selection indicator, such as a click on a designated mouse button. In addition, a user may activate the drop down list button 30 to view a drop down list, which contains other possible values for the selected property. Any drop down list button may be activated just as the property sheet page map button is activated.

Figure 5:
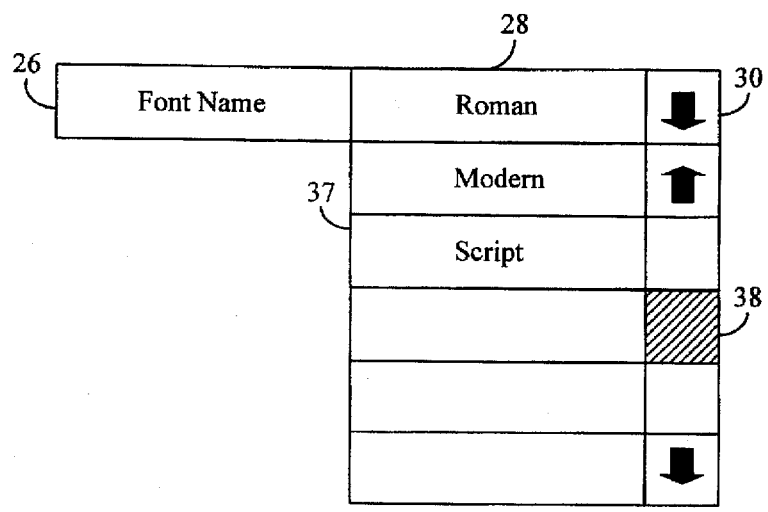
FIG. 5 is an example of a user interface in which a per-property browsing drop down list is displayed as it appears in the preferred embodiment of the invention.

FIG. 5 is an example of a user interface in which a per-property browsing drop down list 37 is displayed as it appears in the preferred embodiment of the invention. A drop down list 37 is displayed when the drop down list button 30 has been activated for a particular property. The drop down list 37 shows other possible values for the property. For instance, when the property name 26 is "Font Name" and the current property value is "Roman" 28, the drop down list 37 indicates that other possible values include "Modern" and "Script." By using the scroll bar 38, as discussed above, or by depressing the page up or page down keys on the keyboard 10, a user may scroll through the possible values. An element may be selected from the drop down list 37 by pointing at it with a mouse 4 and clicking a designated mouse button. In addition, an element may be selected by depressing the arrow keys on the keyboard 10 in order to move to the desired element. When an element is selected from the drop down list 37, the element replaces the current property value. For instance, if the element "Modern" were selected, it would replace "Roman" as the current property value. In the following discussion, each drop down list may be scrolled in this manner and elements in the drop down list may be selected as described here.

FIG. 6 is an example of a user interface in which an application defined property sheet page 44 is generated in accordance with the preferred embodiment of the invention. A property sheet page browser 42 is within a window 40. The property sheet page browser 42 is part of the development environment, and it provides the framework within which an application defined property sheet page 44 displays itself. The property sheet page browser 42 contains a tab 45 which identifies a property group. For instance, tab 45 indicates that the property sheet page is the "Font" property group. Other tabs 46 are also displayed alongside tab 45 in such a way that the display resembles a set of tabbed index cards. The other tabs 46 represent other property groups associated with a particular object. The application defined property sheet page 44 contains various properties of an object which may be displayed and edited. For example, the "Font" property group 45 has property names "Font Name" 47 and "Font Size" 52. The property name "Font Name" 47 has a current property value 48 and a drop down list button 49. When the drop down list button 49 for "Font Name" is activated by a user, the drop down list 50 for "Font Name" 47 is displayed. The drop down list 50 shows other possible values for the "Font Name" property. Similarly, the property name "Font Size" 52 has a current property value 53 and a drop down list button 54, which when activated displays a drop down list with other possible size values. In addition the property sheet page browser 42 has an OK button 55, a CANCEL button 56, and an APPLY button 57. Each button may be activated as the drop down list button is activated. Additionally, a user may select one of these buttons using a tab key to move to the button, and a user may activate the button by depressing the enter key on the keyboard 10. The OK button applies any modifications the user made while editing and closes the property sheet page browser. The CANCEL button does not apply any modifications the user made while editing and closes the property sheet page browser. The APPLY button applies the modifications the user made, while editing the property sheet page, to the object or objects associated with the application defined property sheet page.

FIG. 7 is an example of a user interface in which a window 60 containing menu options is displayed in accordance with the preferred embodiment of the invention. The window 60 contains a menu bar 62 with a number of menu options. A user may select the "File" menu 64. When the "File" menu is selected, a drop down menu 66 is shown. The drop down menu 66 contains elements relating to a file, including the element Properties 68. A user may select an element in a drop down menu in the same manner as selecting an element in a drop down list. A user may select Properties 68 in order to display and edit a property. Selecting Properties will enable a user to then display and edit properties of an object using either the per-property browsing method or the property sheet page method.

Now that the user interfaces have been discussed, the following discussion will be directed to code. First, however, it may be useful to discuss the interfaces that enable per-property browsing and property sheet page browsing. The per-property browser calls the IPerProperty-Browsing interface. The object having application defined properties supports the IPerPropertyBrowsing interface. The property sheet page browser calls the ISpecifyPropertyPages interface, the IPropertyPage interface, and the IPropertyPageSite interface. An application defined property sheet page supports the IPropertyPage and the IPropertyPageSite interfaces. An object supports the ISpecifyPropertyPages interface. These interfaces will be discussed below.

Before discussing the interfaces used by the per-property browser and property sheet page browser, it is useful to review some fundamental concepts of the Microsoft OLE 2.01 protocol. IUnknown is an interface that all objects must support by definition to comply with Microsoft OLE 2.01. One function identified in the IUnknown interface is the QueryInterface () function. When called, the QueryInterface function retrieves a pointer to an interface that is identified by an input parameter that is passed to the function. By using the QueryInterface () function on an object, the per-property browser and the property sheet page browser can switch between interfaces provided by that object, and thus call functions within the different interfaces supported by that object in order to provide per-property browsing and property sheet page browsing on that object.

Figure 8:
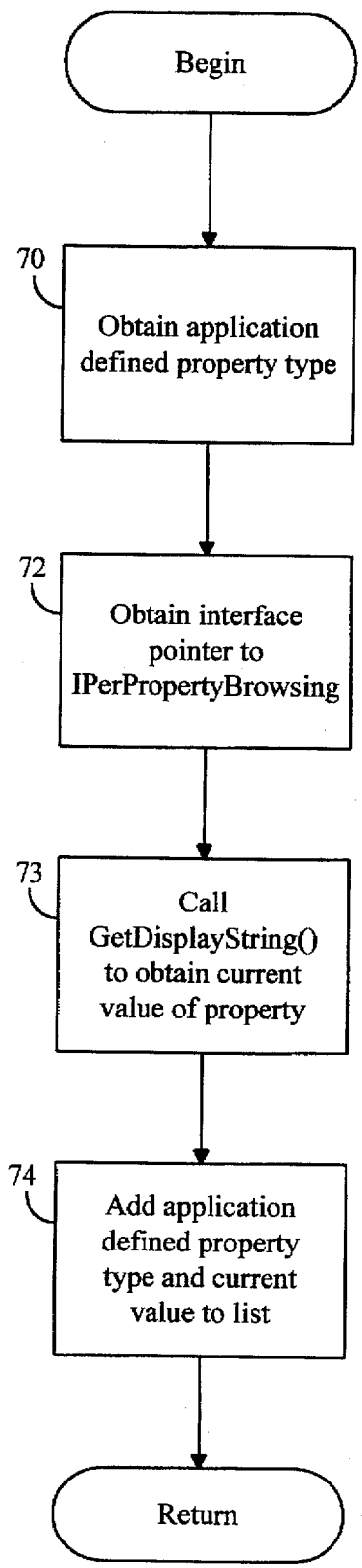
FIG. 8 is a flowchart that provides an overview of the steps performed to add application defined properties to a per-property browsing list for an object.

FIG. 8 is a flowchart that provides an overview of the steps performed to add application defined properties to a per-property browsing list for an object. The per-property browser first obtains the type of the application defined property (step 70) by using the TypeInfo interface defined by Microsoft OLE 2.01 and implemented by an object. Then, the per-property browser calls the QueryInterface () function on the object that has the application defined property to obtain a pointer to the IPerPropertyBrowsing interface provided by the present invention (step 72). The IPerProperty-Browsing interface is defined as follows in C++.

```
interface IPerPropertyBrowsing : IUnknown
{
    GetDisplayString(DISPID dispid, BSTR FAR* lpbstr);
    MapPropertyToPage(DISPID dispid, LPCLSID lpclsid);
    GetPredefinedStrings(DISPID dispid,
        CALPOLESTR FAR* lpcaStringsOut, CADWORD FAR*
        lpcaCookiesOut);
    GetPredefinedValue(DISPID dispid, DWORD dwCookie,
        VARIANT FAR* lpvarOut);
};
```

The GetDisplayString () function retrieves a character string representing the current value of the application defined property to be displayed. The MapPropertyToPage () function enables switching from a per-property browsing list to a property sheet page containing the particular property. In particular, this function maps the property to a property sheet page. The GetPredefinedStrings () function and GetPredefinedValue () function return possible values for a property, along with display names for the values.

After obtaining the pointer to the IPerPropertyBrowsing interface, the per-property browser calls the GetDisplayString () function to obtain the current property value of the property (step 73). Once the per-property browser has the property type and property value, the per-property browser can add these application defined properties to a per-property browsing list along with system defined properties (step 74).

Figure 9:
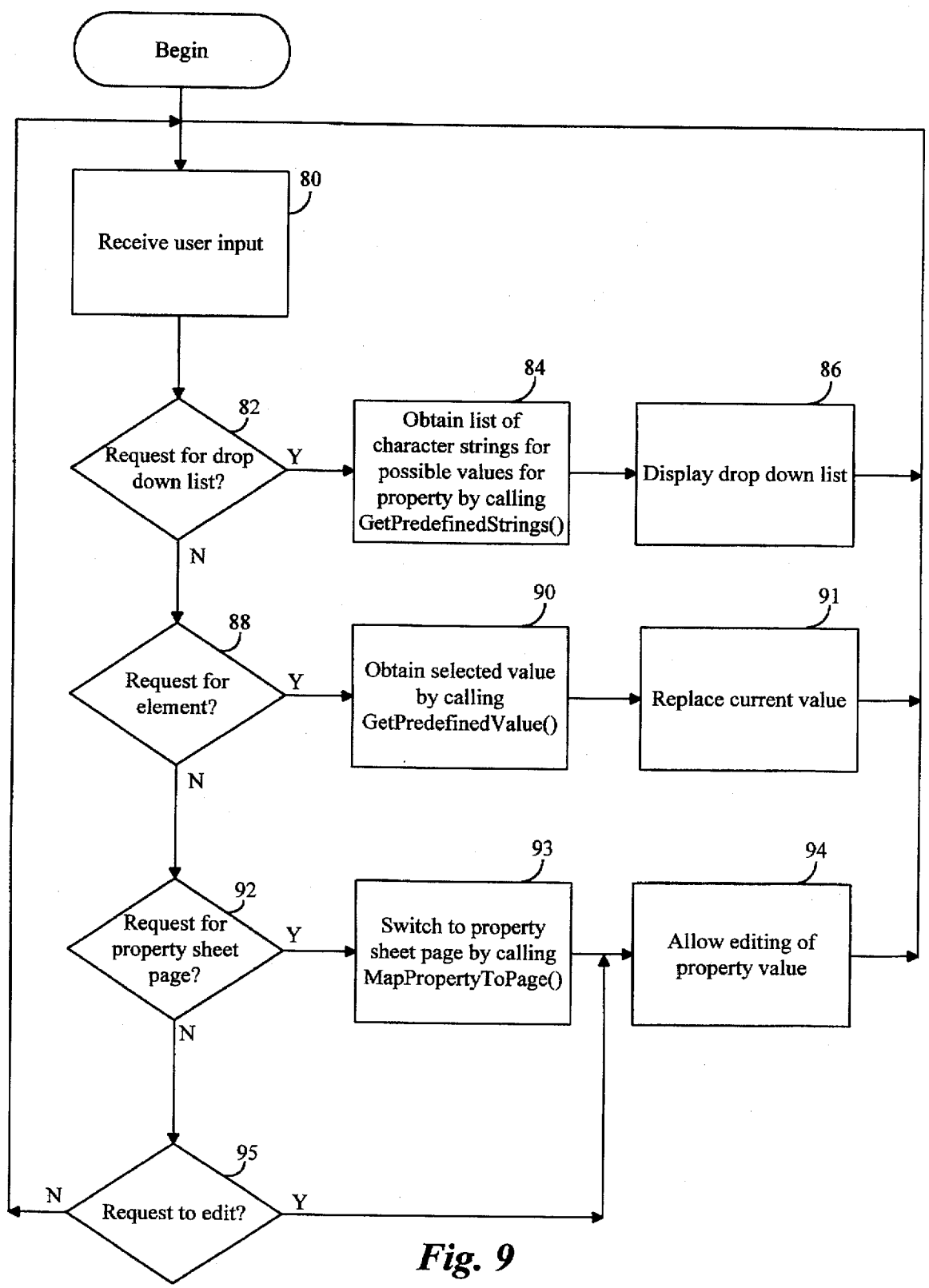
FIG. 9 is a flowchart of the steps performed by the per-property browser when either the drop down list button or the property sheet page map button have been activated.

FIG. 9 is a flowchart of the steps performed by the per-property browser when either the drop down list button or the property sheet page map button have been activated. First, the per-property browser receives user input which indicates which step the per-property browser should take next (step 80). Then the per-property browser determines whether the user input is a request to activate a drop down list button, which indicates a desire to view the drop down list (step 82). If the user input requests activation of the drop down list button, then the per-property browser calls the GetPredefinedStrings () function to obtain character strings corresponding to the possible values of the property (step 84). Then the drop down list is displayed (step 86). If the user input is not a request to activate the drop down list button, then the per-property browser determines if the user input is a request to select an element in a drop down list which is already displayed (step 88). If the user input is a request to select an element, then the per-property browser calls the GetPredefinedValue () function to obtain the value corresponding to the user's choice (step 90). Then this value replaces the current property value (step 91). For example, if the per-property browser receives user input requesting activation of the drop down list button for a color property, which allows selection of a color for text, then the per-property browser calls the GetPredefinedString () function. The GetPredefinedStrings () function may return character strings such as "Red," "Blue," and "Green," which correspond to possible values of the color property. When the user selects one of these character strings, such as "Red," the per-property browser calls the GetPredefinedValue () function. The GetPredefinedValue () function returns the actual value corresponding to the selected character string, such as an RGB value for the selected color "red."

Continuing with the flowchart, if the user input is not a request to select an element, then the per-property browser determines if the user input is a request to activate the property sheet page map button (step 92). If the user input is a request to activate a property sheet page map button, then the user desires to view the currently selected property on a property sheet page. The per-property browser calls the MapPropertyToPage () function to display the currently selected property on a property sheet page (step 93). In particular, the per-property browser calls the MapPropertyToPage () function to obtain an application defined property sheet page identifier for a property sheet page. Then, the per-property browser invokes the property sheet page browser, passing to it the class identifier returned by the MapPropertyToPage () function. Then, the property may be edited on a property sheet page (step 94). If the user input is a request to edit (step 95), then the per-property browser allows editing (step 94). Editing is done by moving to the current property value of a property, using either arrow keys or a mouse, and then manually changing the current property value. If the user input is anything else, the per-property browser ignores the user input and loops to receive more input.

Figure 10:
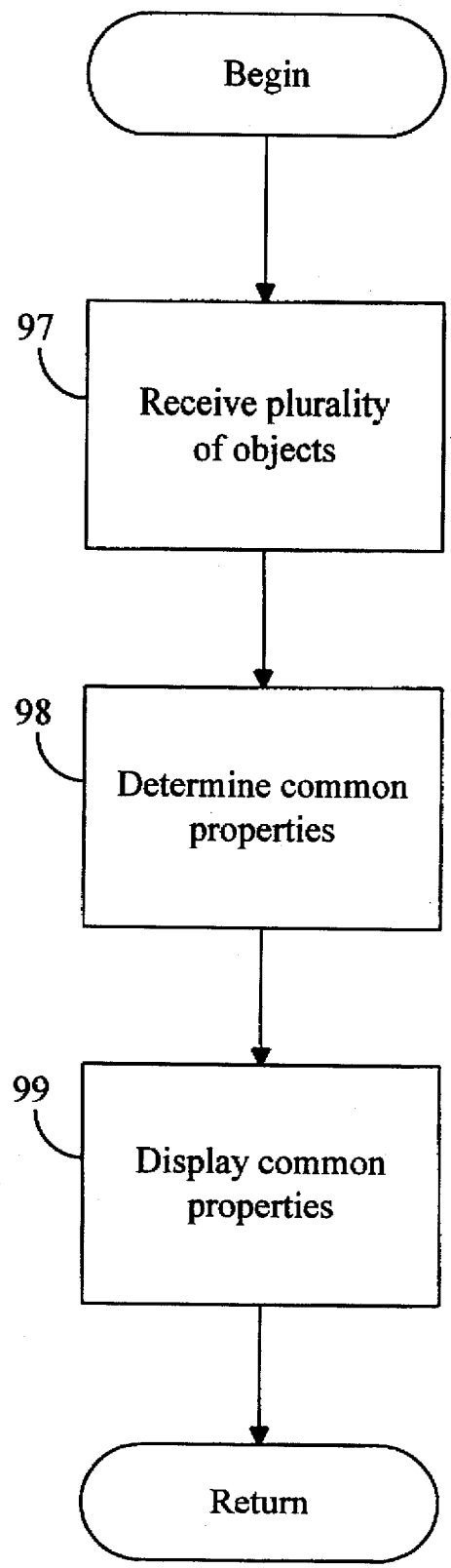
FIG. 10 is a flowchart of multiple selection within per-property browsing.

FIG. 10 is a flowchart of multiple selection within per-property browsing. Multiple selection allows a user to view the common properties of several objects at once. First, the per-property browser receives a plurality of objects (step 97). Then, the per-property browser determines which properties the objects have in common (step 98). Then the per-property browser displays the common properties in a per-property browsing list (step 99).

Figure 11A:
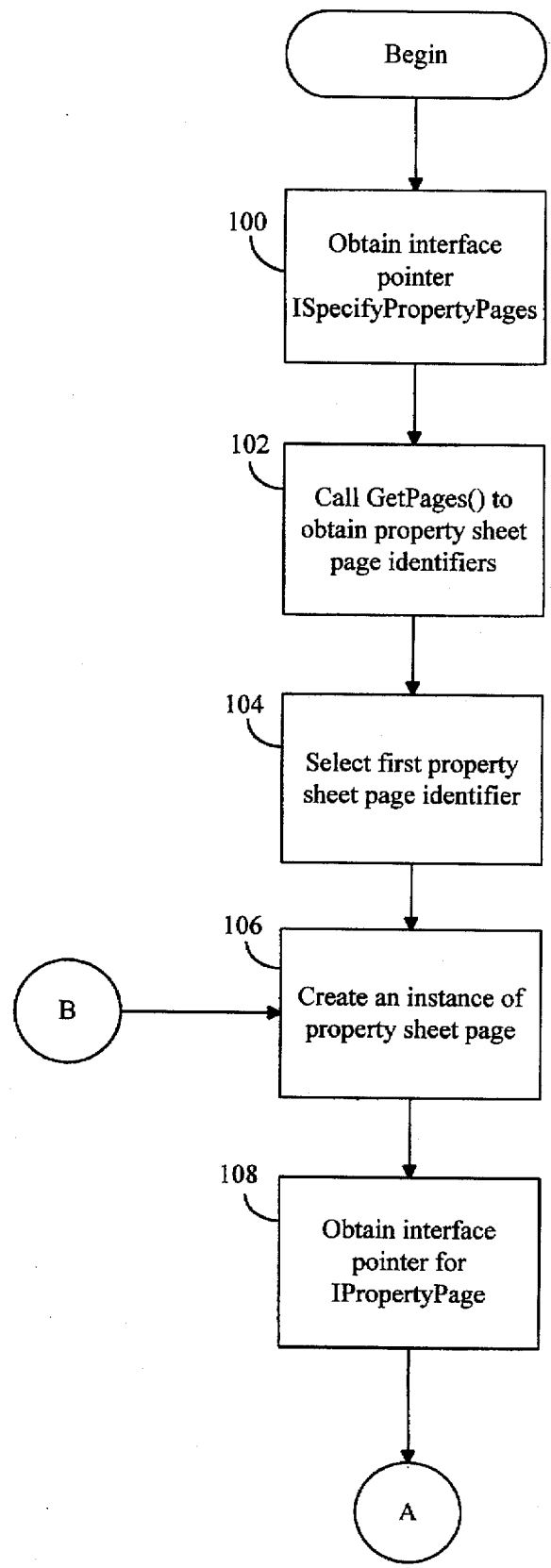
FIG. 11A and FIG. 11B show a flowchart that provides an overview of the steps performed to add application defined property sheet pages to a set of system defined property sheet pages for an object.
Figure 11B:
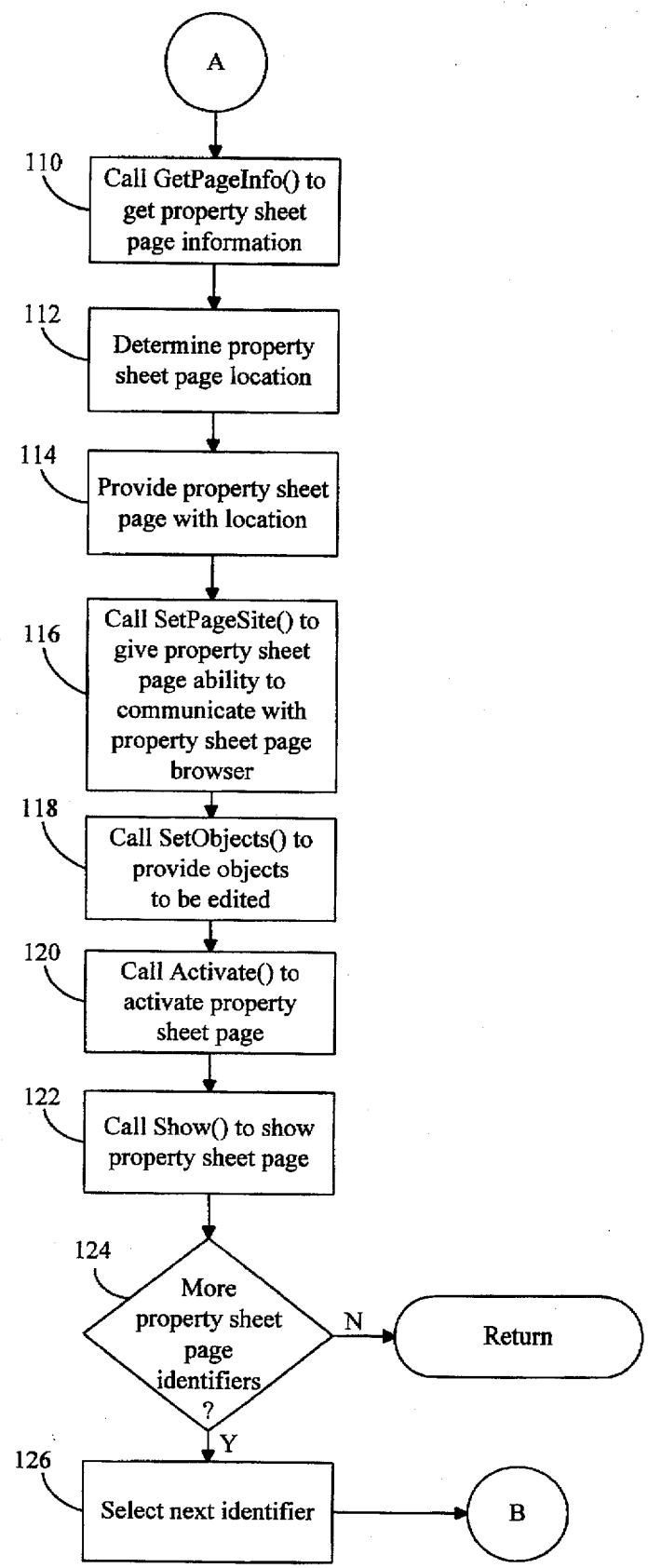

FIG. 11A and FIG. 11B show a flowchart that provides an overview of the steps performed to add application defined property sheet pages to a set of system defined property sheet pages for an object. First, the property sheet page browser must obtain an interface pointer to the ISpecifyPropertyPages interface of the object whose properties are to be browsed (step 100). The ISpecifyPropertyPages interface is defined as follows.

```
interface ISpecifyPropertyPages : IUnknown
{
    GetPages(CAUUID FAR* pPages);
};
```

The GetPages function returns a list of identifiers to the application defined property sheet pages associated with an object. Once the property sheet page browser obtains the ISpecifyPropertyPages interface pointer, the property sheet page browser calls the GetPages () function to obtain a list of application defined property sheet page identifiers (step 102).

Using the application defined property sheet page identifiers, the property sheet page browser adds each application defined property sheet page to the current set of property sheet pages, which already contain system defined property sheet pages. The property sheet page browser selects the first application defined property sheet page identifier (step 104). Then the property sheet page browser creates an instance of an application defined property sheet page for that application defined property sheet page identifier (step 106). Next, the property sheet page browser obtains an interface pointer to IPropertyPage, which is supported by the application defined property sheet page (step 108). The IPropertyPage interface is defined as follows.

```
interface IPropertyPage : IUnknown
{
    SetPageSite(LPPROPERTYPAGESITE pPageSite);
    Activate(HWND hwndParent, LPCRECT lprc, BOOL bModal);
    Deactivate( );
    GetPageInfo(LPPROPPAGEINFO pPageInfo);
    SetObjects(ULONG cObjects, LPUNKNOWN FAR* ppunk);
    Show(UINT nCmdShow);
    Move(LPCRECT prect);
    IsPageDirty( );
    Apply( );
    Help(LPCOLESTR lpszHelpDir);
    TranslateAccelerator(LPMSG lpMsg);
};
```

The property sheet page browser calls the SetPageSite () function to provide the application defined property sheet page with the site object it should use to communicate with the property sheet page browser. For instance, the application defined property sheet page would use the site object to obtain information from the property sheet page browser such as which language the application defined property sheet page should use for displaying its contents. The property sheet page browser calls the Activate () function to provide the application defined property sheet page with information on where to display itself. The property sheet page browser calls the Show () function to display the application defined property sheet page or to hide it. The property sheet page browser calls the Deactivate () function to destroy the resources created by a preceding call to the Activate () function. The property sheet page browser calls the GetPageInfo () function to obtain information about the application defined property sheet page, such as the application defined property sheet page size and whether the application defined property sheet page supports the help function. The property sheet page browser calls the SetObjects () function to pass to the application defined property sheet page a set of objects so that the application defined property sheet page knows what objects to get property values from and apply modifications made by a user while editing to (e.g., in case of multiple selection, multiple objects are passed). The property sheet page browser calls the Move () function to move or resize the application defined property sheet page. The property sheet page browser calls the IsPageDirty () function to determine if the user modified the application defined property sheet page. If modifications were made, then the property sheet page browser enables the Apply button. The property sheet page browser calls the Apply () function to tell the application defined property sheet page to apply modifications to objects. The property sheet page browser calls the Help () function to display help information about the application defined property sheet page. The property sheet page browser calls the TranslateAccelerator () function to communicate certain window messages with the application defined property sheet page.

After obtaining the IPropertyPage interface pointer, the property sheet page browser calls the GetPageInfo () function to obtain application defined property sheet page information (step 110). This information is stored in the following data structure.

```
typedef struct tagPROPPAGEINFO
{
    size_t cb;
    LPOLESTR pszTitle;
    SIZE size;
    LPOLESTR pszDocString;
    LPOLESTR pszHelpFile;
    DWORD dwHelpContext;
} PROPPAGEINFO;
```

This application defined property sheet page information includes pszTitle, which is the title of the application defined property sheet page, size, which is the application defined property sheet page size, and pszHelpfilehich is a help file for the application defined property sheet page.

Next, the property sheet page browser determines the location of the application defined property sheet page (step 112) on the display. The property sheet page browser provides this location information to the application defined property sheet page (step 114). The property sheet page browser then calls the SetPageSite () function to give the application defined property sheet page a means of communicating with the property sheet page browser (step 116). After this, the property sheet page browser calls the SetObjects () function to provide the application defined property sheet page with the set of objects to which it applies modifications made by a user (step 118). That is, more than one object may support the same application defined property sheet page, and if this is the case, then an application defined property sheet page which is modified applies the modifications to each object which supports the application defined property sheet page. Following this, the property sheet page browser calls the Activate () function to activate an application defined property sheet page (step 120). Next, the property sheet page browser calls the Show () function to display the application defined property sheet page (step 122). Once the Show () function is called, the application defined property sheet page appears to be at the front of what appears to be a set of tabbed index cards. Then the property sheet page browser determines whether there are more application defined property sheet page identifiers (step 124), and if there are, it selects the next application defined property sheet page identifier and processes it to add another application defined property sheet page to its set of property sheet pages (step 126), else it returns.

Figure 12:
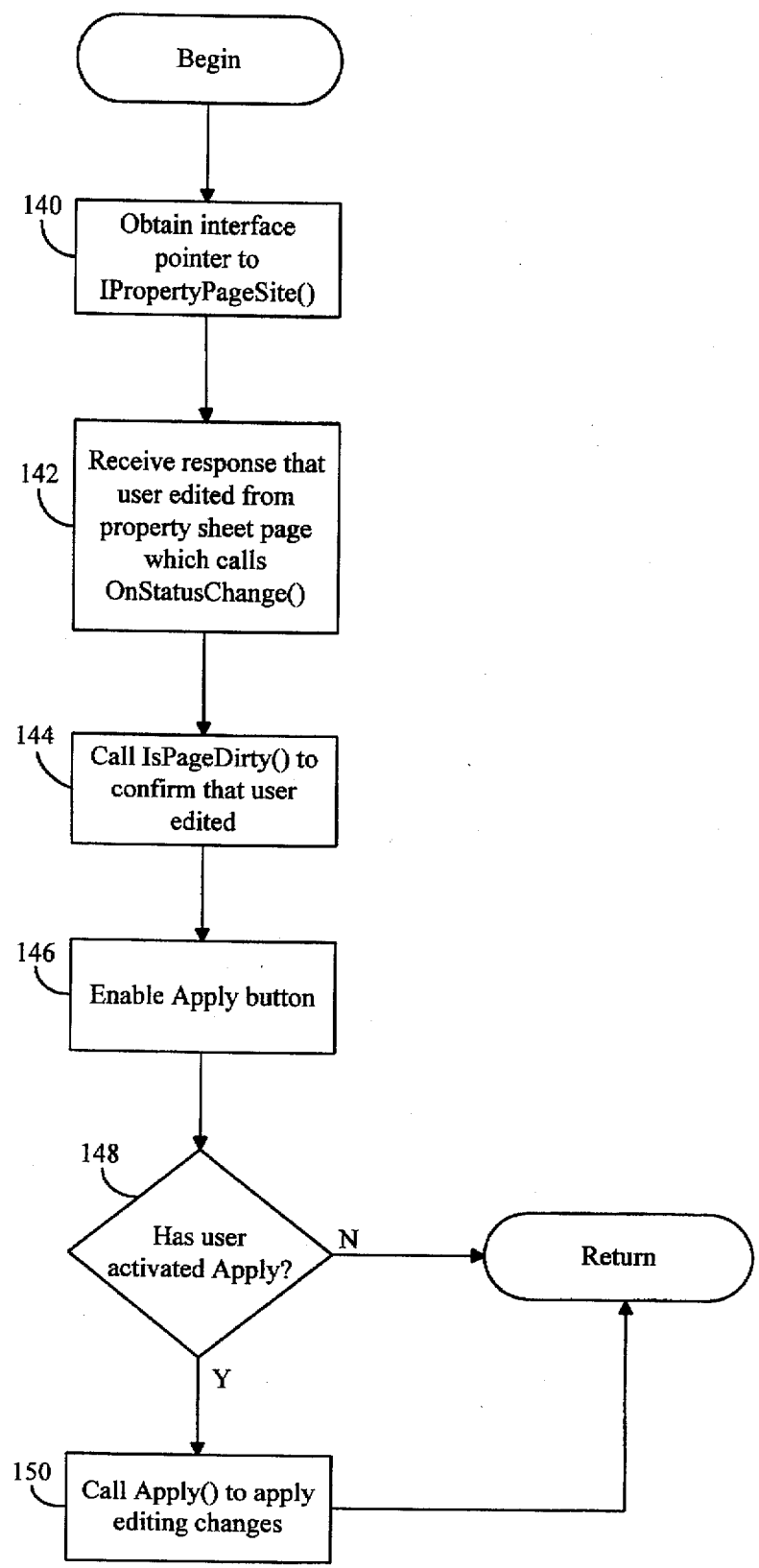
FIG. 12 is a flowchart that provides the steps performed to edit an application defined property sheet page.

FIG. 12 is a flowchart that provides the steps performed to edit properties on an application defined property sheet page. First, the application defined property sheet page obtains a pointer to the IPropertyPageSite interface, which is supported by the application defined property sheet page (step 140). The IPropertyPageSite interface is defined as follows.

```
interface IPropertyPageSite : IUnknown
{
        OnStatusChange(DWORD flags);
        GetLocaleID(LCID FAR* pLocaleID);
        GetPageContainer(LPUNKNOWN FAR* ppUnk);
        TranslateAccelerator(LPMSG lpMsg);
}
```

The application defined property sheet page calls the OnStatusChange function to inform the property sheet page browser that the user made modifications while editing. The application defined property sheet page calls the GetLocaleID () function to learn what language to use for displaying its contents. The application defined property sheet page calls the GetPageContainer () function to get access to the per-property browser if the application defined property sheet page has some special knowledge about what interfaces are supported by the property sheet page browser. The property sheet page calls the TranslateAccelerator () function to communicate certain window messages with the property sheet page browser.

Continuing with the flowchart, when the user has modified an application defined property sheet page, the property sheet page informs the property sheet page browser that the user modified the application defined property sheet page by calling the function OnStatusChange () (step 142). In response to this, the property sheet page browser calls the IsPageDirty () function to confirm that the user has made a change (step 144). If the user has made a change to the property sheet page, the property sheet page browser enables the Apply button (step 146). When the Apply button is enabled, if a user selects the Apply button, the modifications the user made, while editing, to the application defined property sheet page are applied to the set of objects supporting that application defined property sheet page. After enabling the Apply button, the property sheet page browser determines whether the user activated the apply button (step 148). If the user did activate the apply button, then the property sheet page browser calls the Apply () function (step 150), else it returns. Calling the Apply () function tells the application defined property sheet page to apply the modifications to the set of objects it received from the SetObjects () function (step 118 of FIG. 11B).

Figure 13:
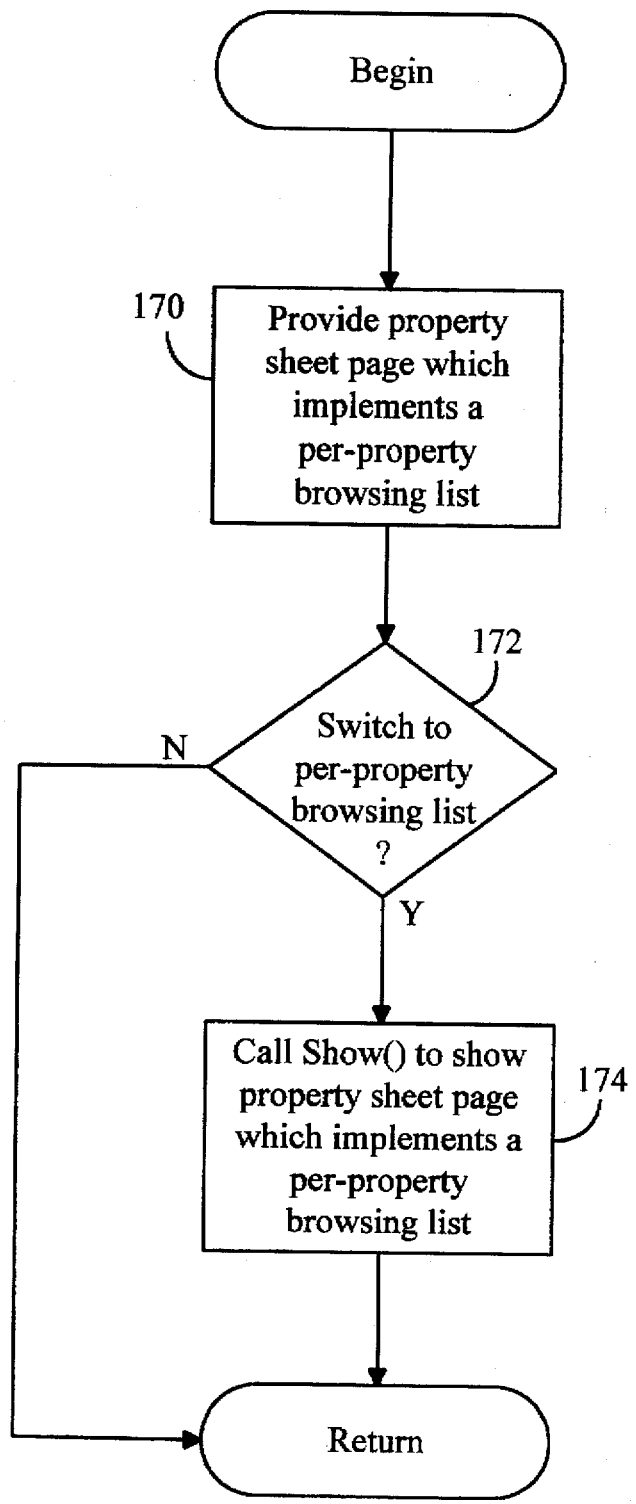
FIG. 13 is a flowchart of the property sheet page browser when it enables switching from application defined property sheet pages to a per-property browsing list.

FIG. 13 is a flowchart of the property sheet page browser when it enables switching from an application defined property sheet page to a per-property browsing list. A particular application defined property sheet page implements the user interface for a per-property browsing list (step 170). Then, the property sheet page browser determines whether a user requested the per-property browsing list (step 172). If a user did request the list, the property sheet page browser calls the Show () function to show the application defined property sheet page which implements the user interface for a per-property browsing list (step 174), else it returns.

Figure 14:
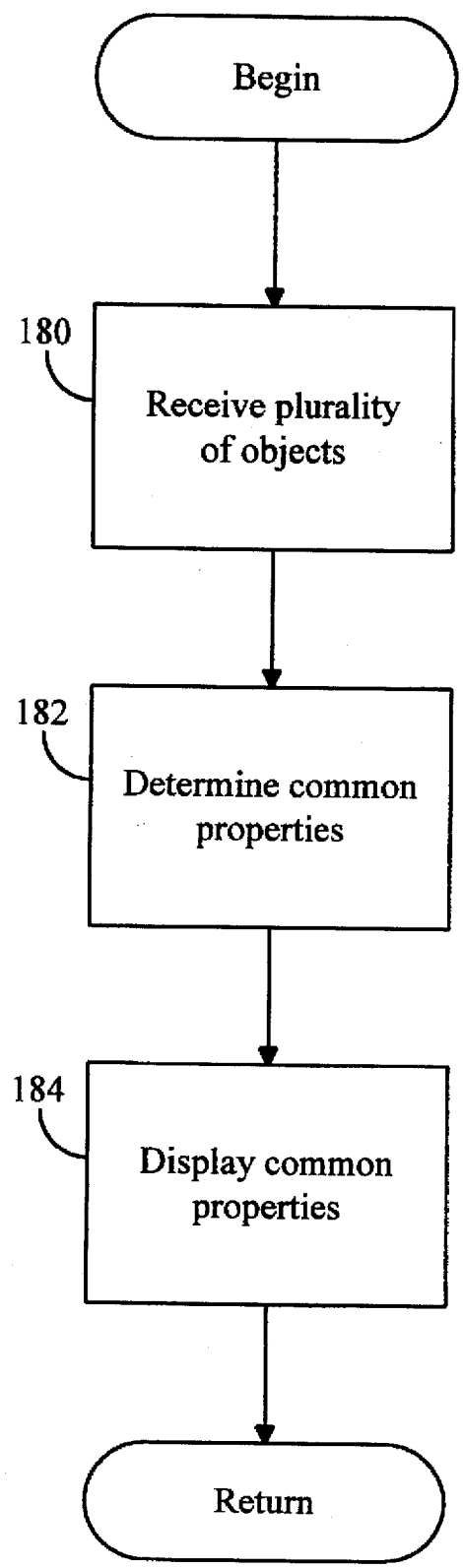
FIG. 14 is a flowchart of multiple selection within per-property browsing.

FIG. 14 is a flowchart of multiple selection within per-property browsing. Multiple selection allows a user to view the common application defined properties of several objects at once. First, the property sheet page browser receives a plurality of objects (step 180). Then, the property sheet page browser determines which application defined properties the objects have in common (step 182). Then the property sheet page browser displays the common application defined properties on a per-property browsing list (step 184).

Figure 15:
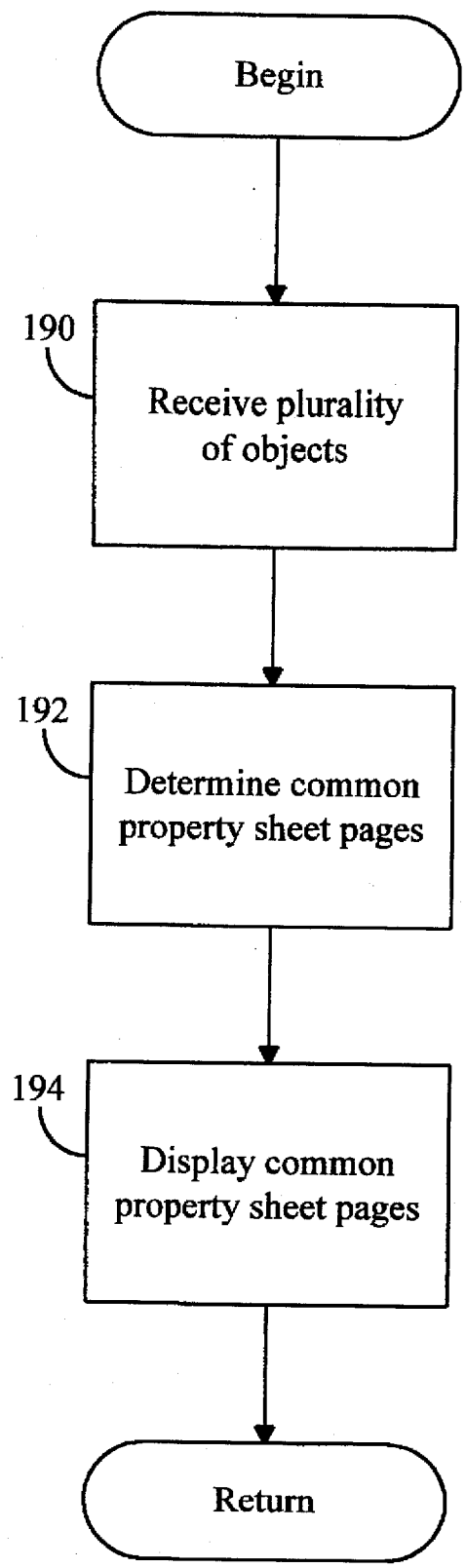
FIG. 15 is a flowchart of multiple selection by a property sheet page browser.

FIG. 15 is a flowchart of multiple selection by a property sheet page browser. Multiple selection allows a user to view the common properties of several objects at once. First, the property sheet page browser receives a plurality of objects (step 190). Then, the property sheet page browser determines which property sheet pages the objects have in common (step 192). Then the property sheet page browser displays the common property sheet pages (step 194).

Although the methods and systems of the present invention have been described in terms of a preferred embodiment, it is not intended that the invention be limited to this embodiment. Modifications within the spirit of the invention will be apparent to those skilled in the art. The scope of the present invention is defined only by the claims that follow.

What is claimed is:

1. In a computer system having a processor, a display device and an application development environment for developing application programs, a method comprising the computer-implemented steps of:

providing a per-property browser as part of the application development environment for displaying a list of identifiers of properties and values of the properties for objects on the display device for editing by a user;

providing a selected object having a first property of a first property type that the per-property browser can display for editing and a second property of a second property type wherein the per-property browser lacks functionality for displaying properties of the second property type for editing and, wherein the first property has an identifier and a value and the second property has an identifier and a value;

providing functionality in the object for exposing the second property to the per-property browser to enable the per-property browser to display the identifier and the value for the second property for editing;

executing the functionality in the object on the processor; and with the per-property browser, displaying the identifiers and the values of both the first property and the second property of the object as part of a selected list on the display device for editing.

2. The method of claim 1 wherein the object may have an associated property sheet page and wherein the method further comprises the step of determining whether the identifier and the value of the first property are also displayable on a property sheet page associated with the object.

3. The method of claim 2, further comprising the step of providing a first property sheet page map button on the selected list, that when activated by a user causes displaying of the property sheet page containing the identifier and the value of the first property, when it is determined that the identifier and the value of the first property are also displayable on a property sheet page associated with the object.

4. The method of claim 3, further comprising the steps of:
receiving user input to activate the first property sheet page map button; and
in response to the user input, displaying the property sheet page for the object on which the identifier and the value of the first property are displayed.

5. The method of claim 1, further comprising the step of providing a second property sheet page map button on the selected list, that when activated by a user causes displaying of the property sheet page when the identifier and the value of the second property are also displayable on the property sheet page.

6. The method of claim 5, further comprising the steps of:
providing program instructions for causing the identifier and the value of the second property to be displayed as part of the property sheet page;
receiving user input to activate the second property sheet page map button;
calling the provided program instructions; and
displaying the property sheet page with the identifier and the value of the second property.

7. The method of claim 1, further comprising the step of providing a drop down list button for the first property on the selected list, said drop down list button being activatable by user input to cause a drop down list to be displayed when activated wherein the drop down list includes possible values for a property.

8. The method of claim 7, further comprising the steps of:
providing program instructions to obtain entries for the drop down list;
receiving user input to activate the drop down list button;
calling the provided program instructions to obtain entries for the drop down list; and
displaying the drop down list on the display device.

9. The method of claim 1, further comprising the step of providing a drop down list button that is activatable by a user and that when activated causes display of a drop down list when the application defined property has a drop down list associated with it.

10. The method of claim 9, further comprising the steps of:
providing program instructions to obtain entries for the drop down list;
receiving user input to activate the drop down list button;
calling the program instructions to obtain the entries for the drop down list; and
displaying the drop down list on the display device.

11. The method of claim 1, further comprising the step of editing the selected list by modifying a value of a property display in the list on the display device.

12. In a data processing system having a video display, an operating system that includes a property sheet page browser for browsing property sheet pages, an application program, and a set of system defined property sheet pages that are defined by the operating system, a method comprising the steps of:
providing an object and an associated application defined property sheet page for the object that is defined by the application program;
displaying the application defined property sheet page along with the set of system defined property sheet pages on the video display; and
enabling a user to browse the property sheet pages using the property sheet page browser.

13. The method of claim 12
wherein the application defined property sheet page is displayed with a tab indicating a name for the application defined property sheet page.

14. The method of claim 12, further comprising the step of modifying the application defined property sheet page by changing a current value of a property on the application defined property sheet page.

15. In a data processing system having a processing means for running an application program and an operating system, a video display, and a set of system defined property sheet pages that are defined by the defined operating system, the system comprising:
means for displaying the set of system defined property sheet pages;
means for providing an object that is associated with the application program, said object having an associated application defined property sheet page that is defined by the application program; and
means for adding the application defined property sheet page to the set of system defined property sheet pages displayed on the video display.

16. The system of claim 15, further comprising means for modifying the application defined property sheet page on the video display.

17. In a computer system having a processor, a display device and an application development environment for developing application programs, a computer-readable medium holding computer executable instructions for performing a method comprising the computer-implemented steps of:
providing a per-property browser as part of the application development environment for displaying a list of identifiers of properties and values of the properties for objects on the display device for editing by a user;
providing a selected object having a first property of a first property type that the per-property browser can display for editing and a second property of a second property type wherein the per-property browser lacks functionality for displaying properties of the second property type for editing and, wherein the first property has an identifier and a value and the second property has an identifier and a value;

providing functionality in the object for exposing the second property to the per-property browser to enable the per-property browser to display the identifier and the value for the second property for editing;

executing the functionality in the object on the processor; and with the per-property browser, displaying the identifiers and the values of both the first property and the second property of the object as part of a selected list on the display device for editing.

18. The computer-readable medium of claim 17 wherein the object may have an associated property sheet page and wherein the method further comprises the step of determining whether the identifier and the value of the first property are also displayable on a property sheet page associated with the object.

19. The computer-readable medium of claim 18 wherein the method further comprises the step of providing a first property sheet page map button on the selected list, that when activated by a user causes displaying of the property sheet page containing the identifier and the value of the first property, when it is determined that the identifier and the value of the first property are also displayable on a property sheet page associated with the object.

20. The computer readable medium of claim 19 wherein the method further comprises the steps of:

receiving user input to activate the first property sheet page map button; and in response to the user input, displaying the property sheet page for the object on which the identifier and the value of the first property are displayed.

21. The computer-readable medium of claim 17 wherein the method further comprises the step of providing a second property sheet page map button on the selected list, that when activated by a user causes displaying of the property sheet page when the identifier and the value of the second property are also displayable on the property sheet page.

22. The computer-readable medium of claim 21 wherein the method further comprises the steps of:

providing program instructions for causing the identifier and the value of the second property to be displayed as part of the property sheet page;

receiving user input to activate the second property sheet page map button;

calling the provided program instructions; and displaying the property sheet page with the identifier and the value of the second property.

23. The computer-readable medium of claim 17 wherein the method further comprises the step of editing the selected list by modifying a value of a property display in the list on the display device.

24. In a data processing system having a video display, an operating system that includes a property sheet page browser for browsing property sheet pages, an application program, and a set of system defined property sheet pages that are defined by the operating system, a computer-readable medium holding computer executable instructions for performing a method comprising the steps of:

providing an object and an associated application defined property sheet page for the object that is defined by the application program;

displaying the application defined property sheet page along with the set of system defined property sheet pages on the video display; and enabling a user to browse the property sheet pages using the property sheet page browser.

25. The computer-readable medium of claim 24 wherein the application defined property sheet page is displayed with a tab indicating a name for the application defined property sheet page.

26. The computer-readable medium of claim 24 wherein the method further comprises the step of modifying the application defined property sheet page by changing a current value of a property on the application defined property sheet page.

27. In a computer system having a display device, an application development environment for developing an application program, wherein said application development environment includes a property sheet browser for browsing property sheet pages, and a set of property sheet pages that are defined by a program other than the application program, a method comprising the computer-implemented steps of:

providing an object that is associated with the application program, wherein the set of property sheet pages are associated with the object;

providing at least one application defined property sheet page that is defined by the application program; and with the property sheet browser, displaying the set of property sheet pages and the application defined property sheet page on the display device.

28. In a computer system having a display device, an application development environment for developing an application program, wherein said application development environment includes a property sheet browser for browsing property sheet pages, and a set of property sheet pages that are defined by a program other than the application program, a computer-readable medium holding computer executable instructions for performing a method comprising the computer-implemented steps of:

providing an object that is associated with the application program, wherein the set of property sheet pages are associated with the object;

providing at least one application defined property sheet page that is defined by the application program; and with the property sheet browser, displaying the set of property sheet pages and the application defined property sheet page on the display device.

\* \* \* \* \*